(12) United States Patent
Kuhn et al.

(10) Patent No.: US 9,805,006 B1
(45) Date of Patent: *Oct. 31, 2017

(54) ASYNCHRONOUS LOADING OF SCRIPTS IN WEB PAGES

(71) Applicant: Google Inc., Mountain View, CA (US)

(72) Inventors: Brian Kuhn, Irvine, CA (US); Kasem Marifet, Costa Mesa, CA (US); James Lee Wogulis, Laguna Beach, CA (US)

(73) Assignee: Google Inc., Mountain View, CA (US)

( * ) Notice: Subject to any disclaimer, the term of this patent is extended or adjusted under 35 U.S.C. 154(b) by 855 days.

This patent is subject to a terminal disclaimer.

(21) Appl. No.: 14/229,392

(22) Filed: Mar. 28, 2014

Related U.S. Application Data

(63) Continuation of application No. 12/612,612, filed on Nov. 4, 2009, now Pat. No. 8,713,424.

(51) Int. Cl.
*G06F 17/00* (2006.01)
*G06F 17/22* (2006.01)
*G06F 17/30* (2006.01)

(52) U.S. Cl.
CPC .... *G06F 17/2247* (2013.01); *G06F 17/30899* (2013.01)

(58) Field of Classification Search
CPC .................. G06F 17/2247; G06F 17/30899
See application file for complete search history.

(56) References Cited

U.S. PATENT DOCUMENTS

| | | | |
|---|---|---|---|
| 2004/0225999 A1 | 11/2004 | Nuss | |
| 2006/0004827 A1 | 1/2006 | Stuart | |
| 2008/0271046 A1 | 10/2008 | Lipton et al. | |
| 2009/0119302 A1 | 5/2009 | Palmer et al. | |

OTHER PUBLICATIONS

"Client-Side Web Scripting with HaskellScript," Erik Meijer, 1998, Springer-Verlag, pp. 196-210.
Notice of Allowance on U.S. Appl. No. 12/612,612 dated Dec. 16, 2013.
Office Action on U.S. Appl. No. 12/612,612 dated Mar. 30, 2012.

*Primary Examiner* — Andrew McIntosh
(74) *Attorney, Agent, or Firm* — Foley & Lardner LLP; John D. Lanza

(57) ABSTRACT

A method of rendering a web page at a client computer identifies a web page selected by a user. The web page references a loadable script that is separate from the web page. The script includes executable code and function definitions. While rendering the web page in a browser or other client resident application, a variable is instantiated to retain information on web page events occurring at the client computer. The script loads asynchronously so that the web page is operable within the client computer system while the script is being loaded. Before the script is fully loaded, one or more command strings representing functions defined in the script are inserted into the variable. After the plurality of function definitions in the script are loaded, one or more functions in the script corresponding to the one or more command strings that were inserted into the variable are executed.

20 Claims, 15 Drawing Sheets

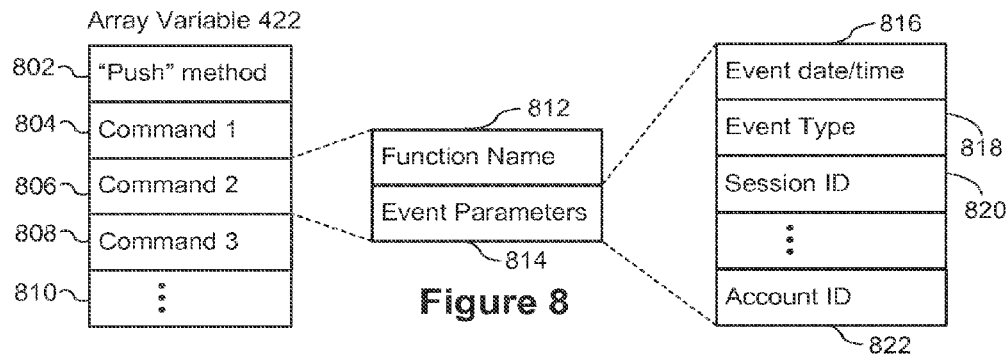

Without Asynchronous Loading

```
1310 →  var pageTracker = _gat._getTracker('UA-65432-1');
1312 →  pageTracker._trackPageview();
1314 →  pageTracker._addTrans(
            '1234',           // order ID - required
            'Mountain View',  // affiliation or store name
            '11.99',          // total - required
            '1.29',           // tax
            '5',              // shipping
            'San Jose',       // city
            'California',     // state or province
            'USA'             // country
        );
1316 →  pageTracker._addItem(
            '1234',           // order ID - required
            'DD44',           // SKU/code
            'T-Shirt',        // product name
            'Green Medium',   // category or variation
            '11.99',          // unit price - required
            '1'               // quantity - required
        );
1318 →  pageTracker._trackTrans();
```

Figure 13A

Pushing Function Calls

```
        _gaq.push(function() {
1320 →    var pageTracker = _gaq._createAsyncTracker('UA-65432-1');
1322 →    pageTracker._trackPageview();
1324 →    pageTracker._addTrans(
              '1234',           // order ID - required
              'Mountain View',  // affiliation or store name
              '11.99',          // total - required
              '1.29',           // tax
              '5',              // shipping
              'San Jose',       // city
              'California',     // state or province
              'USA'             // country
          );
1326 →    pageTracker._addItem(
              '1234',           // order ID - required
              'DD44',           // SKU/code
              'T-Shirt',        // product name
              'Green Medium',   // category or variation
              '11.99',          // unit price - required
              '1'               // quantity - required
          );
1328 →    pageTracker._trackTrans();
        });
```

Figure 13B

Pushing Individual Commands

```
1330 ──▶ _gaq.push(['_setAccount', 'UA-65432-1']);
1332 ──▶ _gaq.push(['_trackPageview']);
1334 ──▶ _gaq.push(['_addTrans',
              '1234',              // order ID - required
              'Mountain View',     // affiliation or store name
              '11.99',             // total - required
              '1.29',              // tax
              '5',                 // shipping
              'San Jose',          // city
              'California',        // state or province
              'USA'                // country
        ]);
1336 ──▶ _gaq.push(['_addItem',
              '1234',              // order ID - required
              'DD44',              // SKU/code
              'T-Shirt',           // product name
              'Green Medium',      // category or variation
              '11.99',             // unit price - required
              '1'                  // quantity - required
        );
1338 ──▶ _gaq.push(['_trackTrans']);
```

Figure 13C

Pushing Multiple Commands

```
_gaq.push(
1340 ──▶  ['_setAccount', 'UA-65432-1'],
1342 ──▶  ['_trackPageview'],
1344 ──▶  ['_addTrans',
              '1234',              // order ID - required
              'Mountain View',     // affiliation or store name
              '11.99',             // total - required
              '1.29',              // tax
              '5',                 // shipping
              'San Jose',          // city
              'California',        // state or province
              'USA'                // country
          ],
1346 ──▶  ['_addItem',
              '1234',              // order ID - required
              'DD44',              // SKU/code
              'T-Shirt',           // product name
              'Green Medium',      // category or variation
              '11.99',             // unit price - required
              '1'                  // quantity - required
          ],
1348 ──▶  ['_trackTrans']
);
```

Figure 13D

Split Loading of the Snippets

```
<html>
<head>
    ...
    <script type="text/javascript">
1402 ──→ var _gaq = _gaq || [];
1404 ──→ _gaq.push(['_setAccount', 'UA-XXXXX-X']);
1406 ──→ _gaq.push(['_trackPageview']);
    </script>
</head>

</body>
    ...

<script src="some-random-script.js"></script>

...

page content

...

<script type="text/javascript">
        document.documentElement.firstChild.appendChild(
            document.createElement('script')).src =
1408 ──     ('https:' === document.location.protocol ? 'https://ssl'
            : 'http://www') + '.google-analytics.com/ga.js';
    </script>
</body>
</html>
```

Figure 14

Alternative Adapter Snippets 222'

```
<script type="text/javascript">
        var AsyncTracker = function(account, name) {
1502————▶ var api = ['_trackPageview', '_trackEvent', '_setDomainName'];
        ┌function n(m) {return
        │       function() {_gaq.push(p+m].concat(Array.prototype.slice.call(arguments)));};}
1504 ——┤   var p=name?name+'.' : ''; for(var i=api.length;i--;) {
        └       this[api[i]]=n(api[i]);} _gaq.push([p+'_setAccount', account]);
    };

var _gaq = _gaq || [ ];

document.documentElement.firstChild.appendChild(document.createElement('script')).src =
('https:' === document.location.protocol ? 'https://ssl' : 'http://www') + '.google-analytics.com/ga.js';

1506 ——▶ var pageTracker = new AsyncTracker('UA-65432-1');
        pageTracker._trackPageview();

</script>
```

Figure 15

ASYNCHRONOUS LOADING OF SCRIPTS IN WEB PAGES

CROSS-REFERENCE TO RELATED APPLICATION

This application claims the benefit of priority under 35 U.S.C. §120 as a continuation of U.S. patent application Ser. No. 12/612,612, filed Nov. 4, 2009, which is incorporated by reference herein in its entirety.

TECHNICAL FIELD

The disclosed embodiments relate generally to web page scripts, and more specifically to methods for asynchronously loading web page scripts while capturing state and activity on the web page.

BACKGROUND

It is useful for web page owners to understand how many users are viewing their web pages and how users interact with the web pages. Code to track this information may be embedded within the web pages, and typically involves downloading one or more other main scripts. As a user opens a web page or interacts with a web page, certain tracking events are captured and transmitted to a remote server.

Existing processes for downloading scripts create several problems. First, downloading one or more large scripts can be time consuming, so synchronous loading can create a perceptible delay to users. Second, the objects and functions defined within the script are not available until they are fully loaded, so important events may not be tracked if they occur before the loading is complete.

More generally, even if a script is loaded asynchronously, existing processes have no access to the objects or functions within the script until the script is fully loaded. Because the objects and functions cannot be accessed, the asynchronous loading is largely the same as synchronous loading.

SUMMARY

The above deficiencies and other problems associated with loading of scripts from web pages are addressed by the present invention. The disclosed embodiments include methods for asynchronously loading a script from a web page, and capturing relevant web page state and activity while the script is loading. Relevant web page events place commands into a data structure (such as an array or object), and the commands within the data structure are executed when the script is fully loaded. Once the script is fully loaded, subsequent web page events of interest typically execute corresponding commands directly rather than inserting the commands into a data structure. In some embodiments, even when the corresponding commands could be executed directly, they may be delayed in order to prevent blocking in the user interface. In some embodiments, commands that execute quickly are executed immediately, whereas commands that take longer to execute may be delayed. In some embodiments, control of delays is established using a "setTimeout( )" function or property defined in the script.

In accordance with some embodiments, a computer-implemented method of rendering a web page at a client computer system includes identifying a web page selected by a user. The web page references a loadable script that is separate from the web page. The script includes executable code and a plurality of function definitions. While rendering the web page in a browser or other client resident application, a variable is instantiated to retain information on web page events occurring at the client computer system. In some embodiments, the variable is instantiated as an array type. The script loads asynchronously so that the web page is operable within the client computer system while the script is being loaded. Before the script is fully loaded, one or more command strings representing functions defined in the script are inserted into the variable. After the plurality of function definitions in the script are loaded, one or more functions in the script corresponding to the one or more command strings that were inserted into the variable are executed.

In accordance with some embodiments, a computer-implemented method executes on a client computer system with one or more processors and memory. The memory stores one or more programs for execution by the one or more processors. The one or more programs include instructions that execute while loading a web page in a client resident application, such as a web browser, on the client computer system. The programs instantiate a variable and asynchronously load an activity tracking script containing executable code and a plurality of functions. In some embodiments the variable is an array. User interaction with the web page is enabled before all of the functions defined in the activity tracking script are ready for execution on the client computer system. While a user is interacting with the web page and before all of the functions defined in the activity tracking script are ready for execution, the programs store into the variable, in response to a web page event, a name of a function defined in the activity tracking script. After the functions defined in the activity tracking script are ready for execution, the programs execute, in order, functions defined in the activity tracking script that correspond to the function names stored in the variable.

Thus methods are provided that enable web pages to asynchronously load scripts, and to place commands in a queue that will execute corresponding functions defined in the script after the script is fully loaded. The syntax to call functions in the script is the same before and after the script is loaded, so that code that makes the function calls need not consider whether the script has been loaded. The disclosed embodiments thus create no perceptible delay to a user who opens a web page, and relevant web page events can be tracked sooner.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 8 illustrates the structure and content of an array variable according to some embodiments.

FIG. 9A provides an exemplary code snippet that loads a main script according to some embodiments.

FIG. 9B provides an alternative exemplary code snippet that loads a main script according to some embodiments.

FIG. 10 illustrates an exemplary HTML tag that tracks events while a user interacts with a web page according to some embodiments.

FIG. 13A illustrates calls to track web page events according to a prior art embodiment.

FIGS. 13B-13D illustrate calls to track web page events according to some embodiments of the present invention.

FIG. 14 is an outline of a web page illustrating embedded snippets of code according to some embodiments.

FIG. 15 illustrates alternative adapter snippets that load a script according to some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

DESCRIPTION OF EMBODIMENTS

Figure 1:
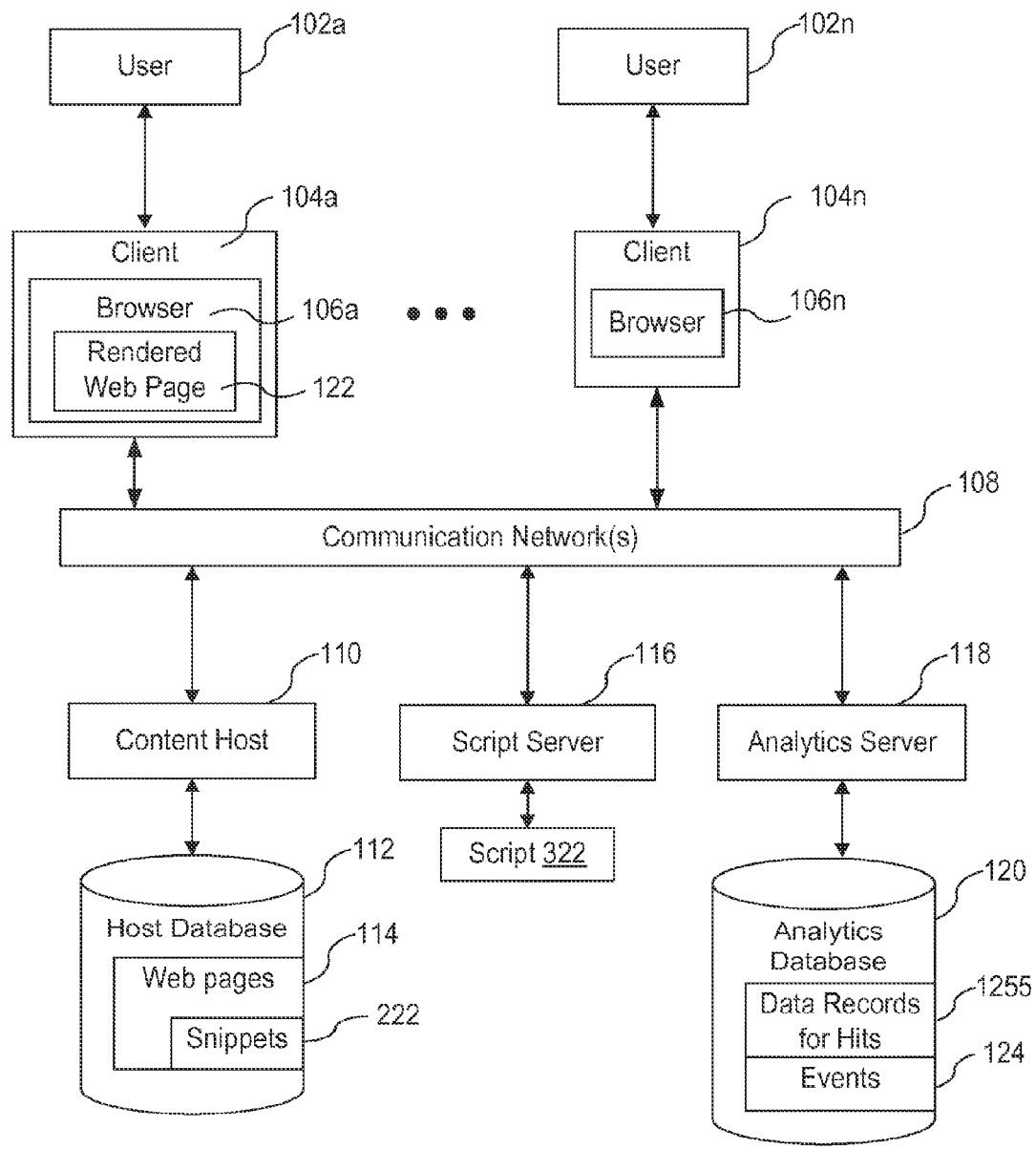
FIG. 1 illustrates an exemplary context in which some embodiments operate.

FIG. 1 is a block diagram of an embodiment in which a script is loaded while rendering a web page. The system communicates over one or more networks 108 (such as the Internet) and includes a user 102 using a client computer system 104 running a client-resident application, such as a browser 106. More generally, there can be a plurality of users 102a, . . . , 102n using respective client computer systems 104a, . . . , 104n with respective browsers 106a, . . . , 106n, each communicating independently with a content host 110. A content host has one or more web pages 114 stored in a host database 112. A web page 114-1 includes one or more small scripts (snippets) 222, which in turn load a larger script 322 from a script server 116 when the page 122 is rendered/loaded by a client-resident application, such as a browser 106. As used herein, web page "122" identifies a web page that is fully or partially rendered in a browser 106 (or other client resident application) at a client 104, whereas web pages 114 reside at a content host 110. A user 102 can begin to interact with a rendered (or partially rendered) web page 122. A detailed description of the script loading is described below with respect to FIGS. 5A, 5B, 6, and 7. In some embodiments, the script provides functionality to track web page state and events. In these embodiments, tracking events 124 associated with a web page typically result from user interactions with the web page 122, and are transmitted from a client 104 to an analytics server 118. The analytics server 118 collects and aggregates the tracking events 124 for reporting in an analytics database 120. In addition, the analytics database 120 includes data records for hits 1255, described in more detail below with respect to FIG. 12. More details about an analytics server 118 are provided below with respect to FIG. 11. In some embodiments, the script server 116 and analytics server 118 are combined.

Figure 2:
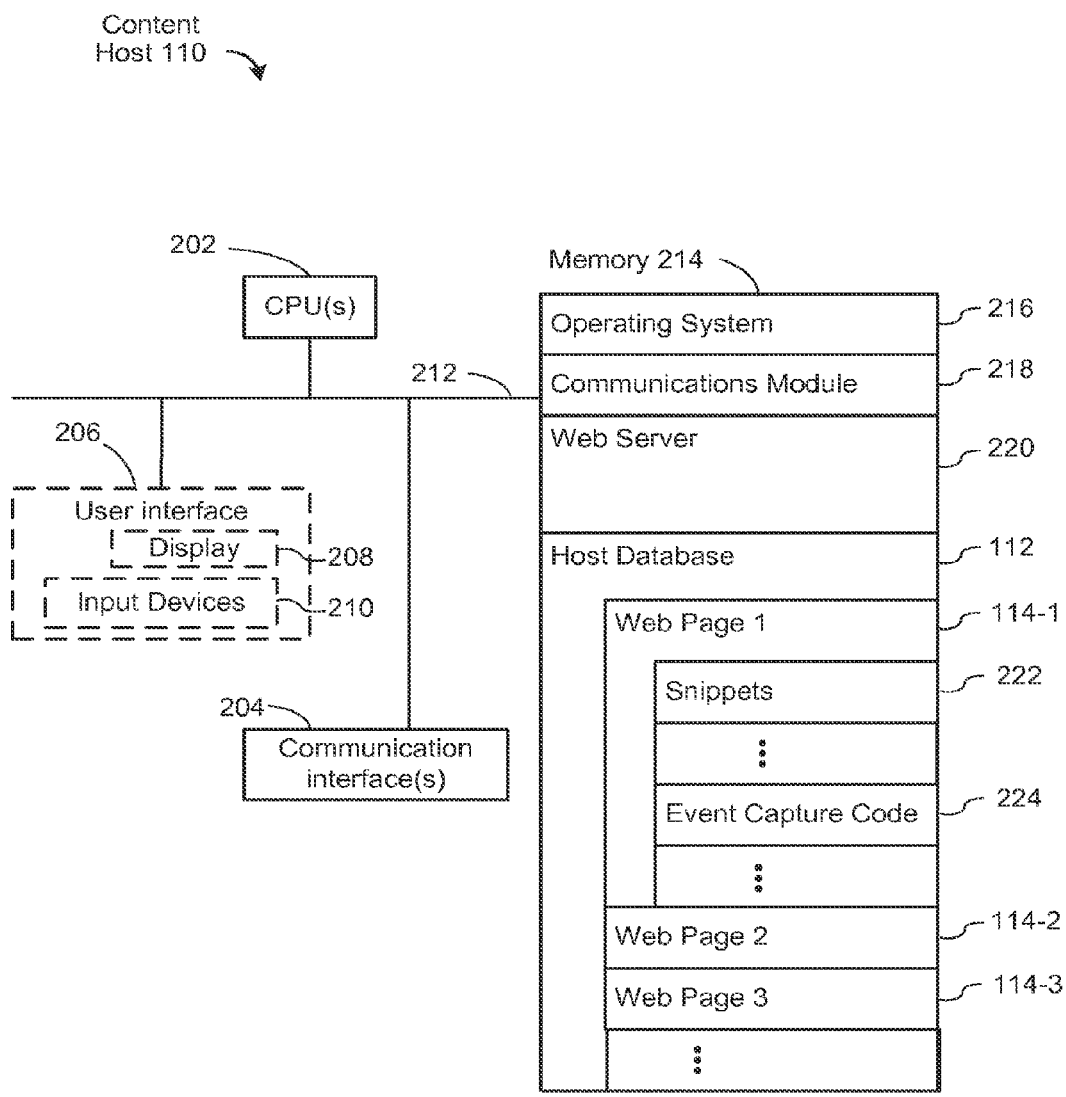
FIG. 2 is a functional description of a host computer system according to some embodiments.
Figure 3:
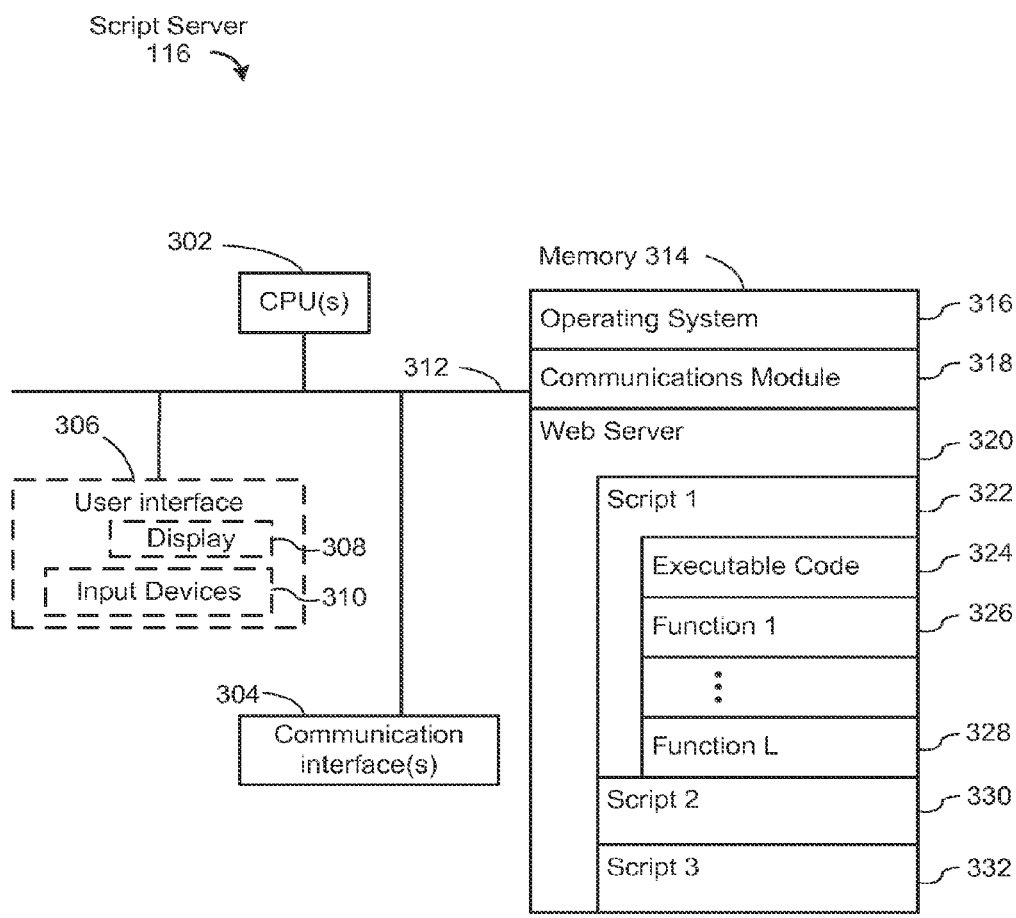
FIG. 3 is a functional description of a script server computer system according to some embodiments.

FIG. 2 is a block diagram illustrating a content host computer system 110 used to deliver web pages in accordance with some embodiments of the present invention. The content host 110 typically includes one or more processing units (CPU's) 202 for executing modules, programs and/or instructions stored in memory 214 and thereby performing processing operations; one or more network or other communications interfaces 204; memory 214; and one or more communication buses 212 for interconnecting these components. In some embodiments, the content host 110 includes a user interface 206 with a display device 208 and one or more input devices 210. In some embodiments, memory 214 includes high-speed random access memory, such as DRAM, SRAM, DDR RAM or other random access solid state memory devices. In some embodiments, memory 214 includes non-volatile memory, such as one or more magnetic disk storage devices, optical disk storage devices, flash memory devices, or other non-volatile solid state storage devices. In some embodiments, memory 214 includes one or more storage devices remotely located from the CPU(s) 202. Memory 214, or alternately the non-volatile memory device(s) within memory 214, comprises a computer readable storage medium. In some embodiments, memory 214 or the computer readable storage medium of memory 214 stores the following programs, modules and data structures, or a subset thereof:

- an operating system 216 that includes procedures for handling various basic system services and for performing hardware dependent tasks;
- a network communication module 218 that is used for connecting the content host to other computers via the one or more communication network interfaces 204 (wired or wireless) and one or more communication networks 108, such as the Internet, other wide area networks, local area networks, metropolitan area networks, and so on;
- a web server 220 that receives requests for web pages and delivers the requested web pages to the requesting client;
- a host database 112 that serves as a repository for the web pages 114 stored at the content host 110. At least some of the web pages 114 include code snippets 222 that reference an activity script (e.g., an activity script 322 as shown in FIG. 3). When a web page 114-1 is rendered in a browser on a client 104, the activity script referenced by that page 114-1 is asynchronously downloaded to and executed on the client 104 in order to monitor user events/activity in relation to the web page 114-1 or other web pages 114 from the same client host.

In some embodiments, the events/activities include online purchases or clicking on a button or hyperlink. In some embodiments, additional code snippets may be included in web pages 114 to perform other tasks. Some of the user events/activity are tracked by one or more segments of event capture program code 224, as shown in FIG. 10 below. Tracking of ecommerce activity is illustrated in FIGS. 13B-13D below.

In some embodiments, the database 112 stores information in addition to web pages. For example, the database 122 may store user login information, user profiles, or configuration information.

FIG. 3 is a block diagram illustrating a script server 116 used to deliver web page scripts in accordance with some embodiments of the present invention. The script server 116 typically includes one or more processing units (CPU's) 302 for executing modules, programs and/or instructions stored in memory 314 and thereby performing processing operations; one or more network or other communications interfaces 304; memory 314; and one or more communication buses 312 for interconnecting these components. In some embodiments, the script server 116 includes a user interface 306 with a display device 308 and one or more input devices 310. In some embodiments, memory 314 includes high-speed random access memory, such as DRAM, SRAM, DDR RAM or other random access solid state memory devices. In some embodiments, memory 314 includes non-volatile memory, such as one or more magnetic disk storage devices, optical disk storage devices, flash memory devices, or other non-volatile solid state storage devices. In some embodiments, memory 314 includes one or more storage devices remotely located from the CPU(s) 302. Memory 314, or alternately the non-volatile memory device(s) within memory 314, comprises a computer readable storage medium. In some embodiments, memory 314 or the computer readable storage medium of memory 314 stores the following programs, modules and data structures, or a subset thereof:

- an operating system 316 as described above with respect to operating system 216;
- a network communication module 318 as described above with respect to communications module 218; and
- a web server 320 that receives requests for scripts from client computer systems 104 and delivers the requested scripts to the requesting client computer systems 104. The web server stores, or has access to, one or more scripts 322, 330, and 332. As mentioned with respect to FIG. 2, an activity tracking script 322 is downloaded to a client 104, and is configured to monitor and report user activity/events in relation to a particular web page or web pages associated with a particular web site. A script 322 includes both executable code 324, that executes as the script is loaded, and function definitions Function 1 (326) to Function L (328). In preferred embodiments, the function definitions are included in object definitions. For example, in some embodiments, the script 322 includes the definition of a tracker object, and the tracker object includes functions such as "_setAccount" and "_trackPageview", which are defined in the script.

Figure 4:
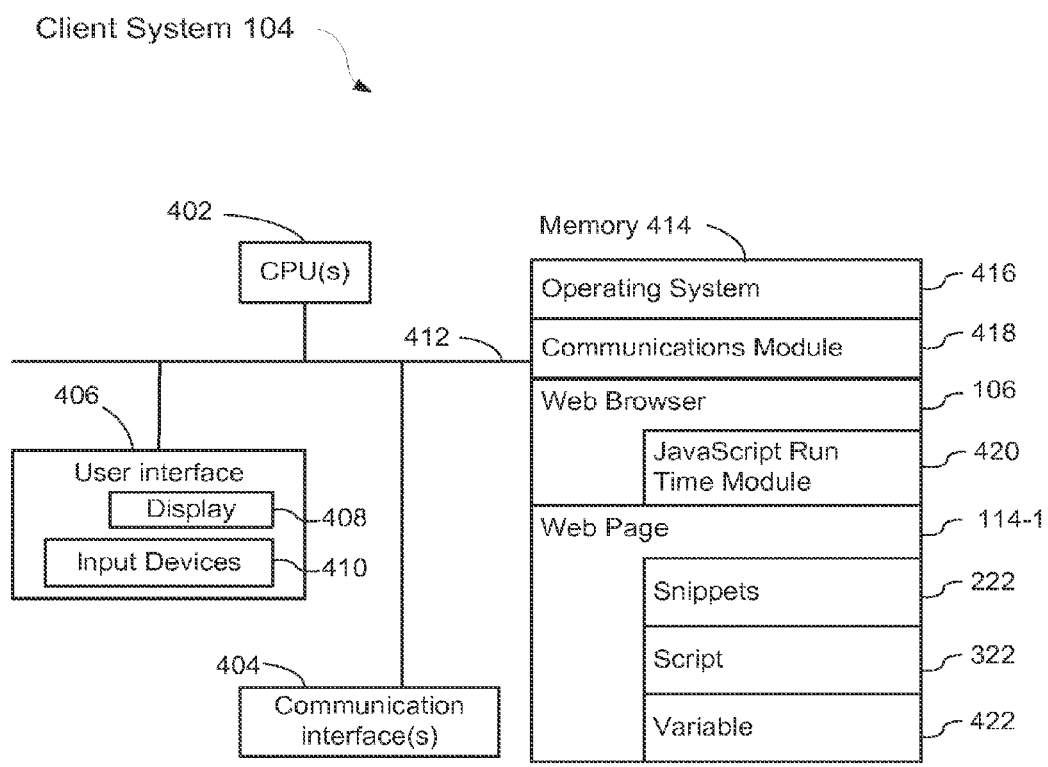
FIG. 4 is a functional description of a client computer system according to some embodiments.

FIG. 4 is a block diagram illustrating a client computer system 104 which may be used by a user to access and view web pages in accordance with some embodiments of the present invention. The client computer system 104 typically includes one or more processing units (CPU's) 402 for executing modules, programs and/or instructions stored in memory 414 and thereby performing processing operations; one or more network or other communications interfaces 404; memory 414; and one or more communication buses 412 for interconnecting these components. The client computer system 104 includes a user interface 406 with a display device 408 and one or more input devices 410. In some embodiments, memory 414 includes high-speed random access memory, such as DRAM, SRAM, DDR RAM or other random access solid state memory devices. In some embodiments, memory 414 includes non-volatile memory, such as one or more magnetic disk storage devices, optical disk storage devices, flash memory devices, or other non-volatile solid state storage devices. In some embodiments, memory 414 includes one or more storage devices remotely located from the CPU(s) 402. Memory 414, or alternately the non-volatile memory device(s) within memory 414, comprises a computer readable storage medium. In some embodiments, memory 414 or the computer readable storage medium of memory 414 stores the following programs, modules and data structures, or a subset thereof:

- an operating system 416 as described above with respect to operating system 216;
- a network communication module 418 as described above with respect to communications module 218;
- a web browser 106 (or other client resident application configured to view web pages) that renders web pages for viewing by a user. In some embodiments, the web browser 106 includes a JavaScript® run-time module that can execute scripts embedded in a web page 114-1, or scripts that are downloaded by the web page 114-1. ("JavaScript" is a registered trademark of Sun Microsystems.); and
- one or more web pages 114, which are rendered by the web browser 106 for display to a user 102. Some web pages 114-1 include code snippets 222, which comprise chunks of program code. In some embodiments, code snippets are written in JavaScript. In some embodiments, code snippets 222 instantiate one or more variables 422, which may be global variables. In some embodiments, code snippets 222 load a larger script 322, such as an activity tracking script. As described below in greater detail, an activity tracking script is a script that contains executable code and function definitions. In preferred embodiments, the functions in an activity script are object methods, and provide functionality to track events that occur when users interact with rendered web pages 122. One way to load a script is to execute the JavaScript function "document.write (script name/location)", where the parameter specifies the name and network location of the script. As used herein, the term "function" is used broadly, to include all forms of functions and procedures, including functions and procedures that are included in class definitions for objects. Using the "document.write( )" function, however, loads the named script synchronously, so no other activity occurs on the web page 114-1 until after the named script is fully loaded. As described in more detail with respect to FIG. 9 below, some embodiments of the present invention load a script in a different way so that execution is asynchronous.

Figure 5A:
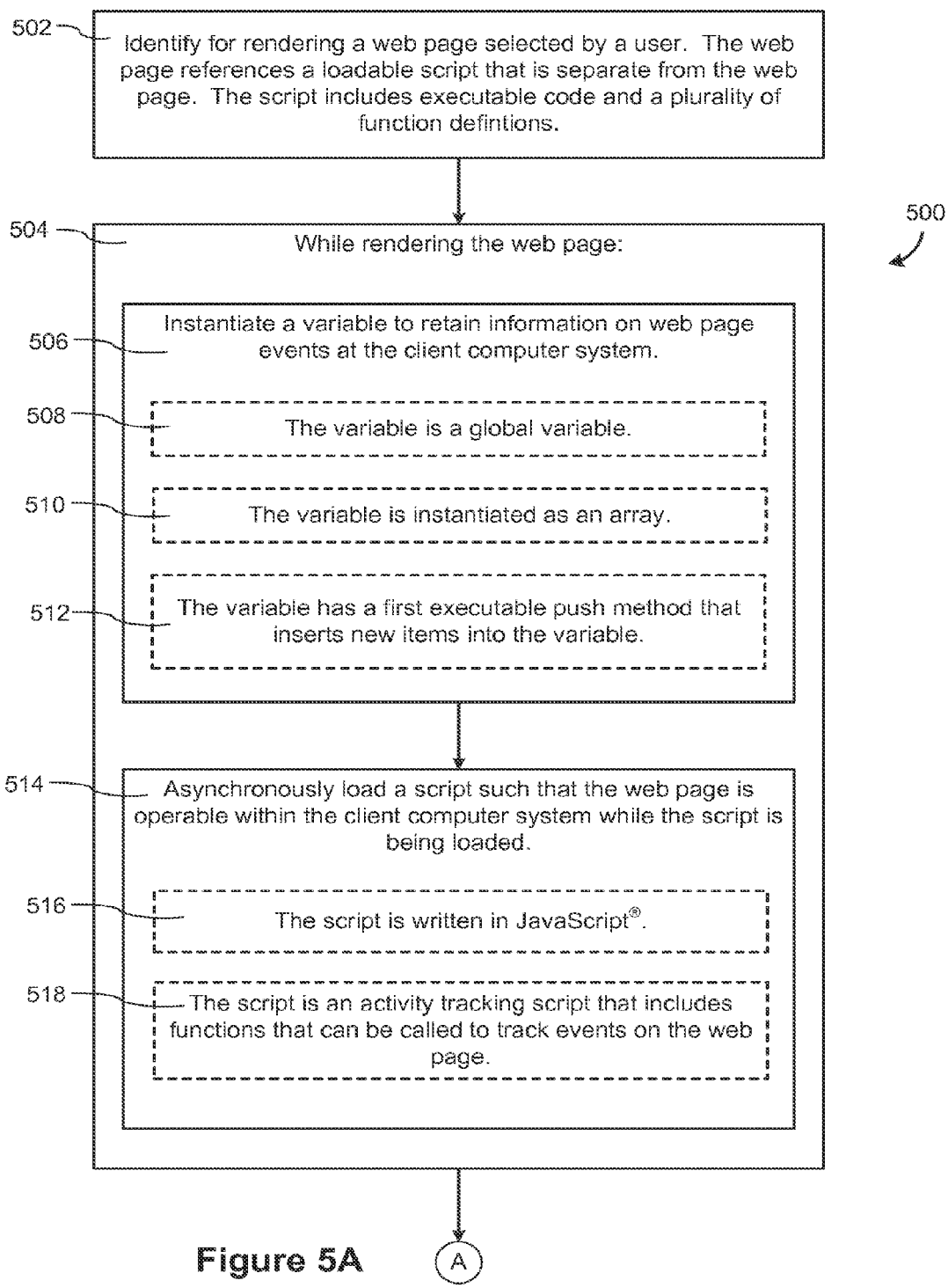
FIGS. 5A and 5B provide a descriptive process flow for asynchronously loading a script according to some embodiments.
Figure 5B:
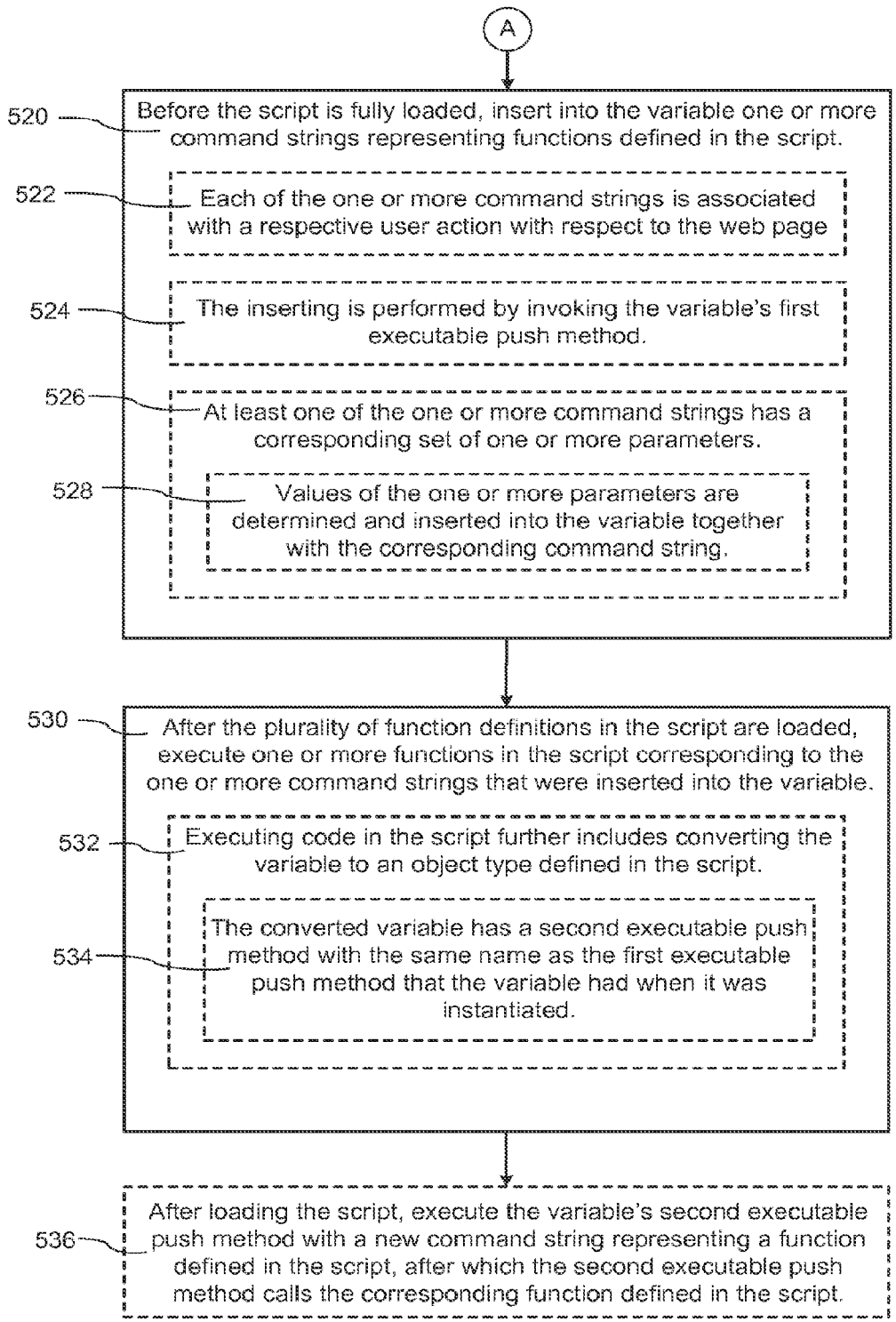

FIGS. 5A and 5B provide a descriptive process flow for a method 500 of rendering a web page on a client system 104 in accordance with some embodiments. Typically, a user 102 of the client system 104 identifies (502) a web page 114-1 for rendering. In some cases, a web page 114-1 is identified (502) for rendering by a program or indirect user selection.

The web page references a loadable script that is separate from the web page. The script includes executable code and a plurality of function definitions. A user 102 may select a web page 114-1 in multiple ways, including typing in a web page address, selecting the web page from a favorites list, or following a hyperlink on another web page. In some instances the web page is selected programmatically. After the web page 114-1 is identified, the browser 106 requests the web page 114-1 from a content host 110, and begins to render the web page 122 in the browser 106. As described with respect to FIGS. 2, 3 and 4, in some embodiments the web page 122 being rendered includes code snippets 222 that reference an activity tracking script 322 located on a script server 116. The operations described below with respect to the method 500 allow the user 102 to start interacting with the web page 122 while the activity tracking script 322 is asynchronously downloaded from the script server 116. At the same time (i.e., while the script 322 is being downloaded and executed), information about user interaction with the web page is retained for later processing using functions in the activity tracking script 322 (once the script 322 is loaded). In some embodiments, the retained information about the events is collected as the events occur and the events are subsequently processed by the activity tracking script 322 in the order of their occurrence. As a result, the tracking script reports on the events as if the object and function definitions in the script 322 had been available for operation when the events originally occurred. This preserves for subsequent analytics use important information as to when the events actually occurred and the actual ordering of and relationship between those events.

While rendering (504) the web page 122 in the browser 106 (or other client resident application in other embodiments) several operations are performed. In response to statements in the code snippet 222, the browser 106 instantiates a variable 422 to retain information on web page events at the client computer system (506). (The web page 114-1 may also have other code snippets that are unrelated to loading the script 322.) In some embodiments, the variable 422 is a global variable (508). In some embodiments, the variable is instantiated as an array data type (510). In some embodiments, the instantiated variable 422 includes an executable "push" method (512) that can be called to insert new elements into the variable (e.g., into an array). In some embodiments, the variable is used to store information about user interactions with the web page (e.g., events) that occur while a tracking script is being loaded by the browser. In this way, calls to functions that are defined in the script 322 are placed in a queue, and subsequently executed after the function definitions from the script 322 have been loaded. For example, the activity tracking script "ga.js" used by Google Analytics includes definitions for the functions "_trackPageview", "_trackEvent", "_addTrans", and "_addItem". Even before the "ga.js" script is fully loaded, these commands (and many others) can be placed in the queue.

A script 322 containing executable code 324 and a plurality of function definitions 326 to 328 is loaded asynchronously by the browser 106 or other client resident application (514). By loading the script asynchronously, the web page is operable within the client computer system while the script is being loaded. In some embodiments, the script 322 is written in JavaScript (516). In most browsers that support the HTML 4.01 specification, the following JavaScript code will result in asynchronous loading of the script: "document.documentElement.firstChild.appendChild(script)", where "script" includes the name and location of the script to load. In some embodiments, the script is an activity tracking script that includes functions that can be called to track events on the web page (518).

Before the script 322 is fully loaded, the client system 104 inserts (520) one or more command strings 812 into the variable 422 that was instantiated. The command strings 812 represent functions defined in the script 322. In some embodiments, each of the one or more command strings is associated with a respective user action with respect to the web page 114-1 (522). In some embodiments, the command strings 812 are inserted into the variable by invoking the variable's executable "push" method 802 (524). In some embodiments, at least one of the command strings 812 has a corresponding set of one or more parameters 814 (526). In some embodiments, when a command string 812 has one or more parameters, the values of the parameters are determined and inserted into the variable together with the corresponding command string (528). In some embodiments, command strings 812 (with associated parameters 814, if any) are inserted into the variable as command arrays. In these embodiments, when the variable 422 is an array, it is an array whose elements are also arrays. In other embodiments, the variable 422 is a two dimensional array in which rows represent individual commands, the first column contains the name of the command, and the subsequent columns contain the parameter values.

After the plurality of function definitions in the script 322 are loaded, the client system 104 executes one or more functions in the script 322 corresponding to the one or more command strings 810 that were inserted into the variable 422 (530). Because the script 322 is loaded asynchronously, this portion of the script 322 may execute before or after the web page is fully rendered in the browser 106. In some embodiments, the command strings 810 are executed in order (i.e., the order in which they were inserted into the variable). In some embodiments, after executing all of the commands in the variable 422, the variable 422 is recast (or converted) (532) as an object whose definition has already been loaded by the script 322. In some embodiments in which the variable 422 is converted to an object, the object has an executable "push" method (534). In particular, the executable push method defined for the converted variable has the same name as the executable push method that the variable had when it was originally instantiated (534).

In some embodiments, after loading the script, the client system 104 executes the variable's executable push method (corresponding to the new object type of the variable) with a new command string, after which the executable push method calls the corresponding function defined in the script (536). In particular, because the script is loaded and the variable has a new type, the command is executed directly rather than being placed in a queue (e.g., an array) for later processing.

Figure 6:
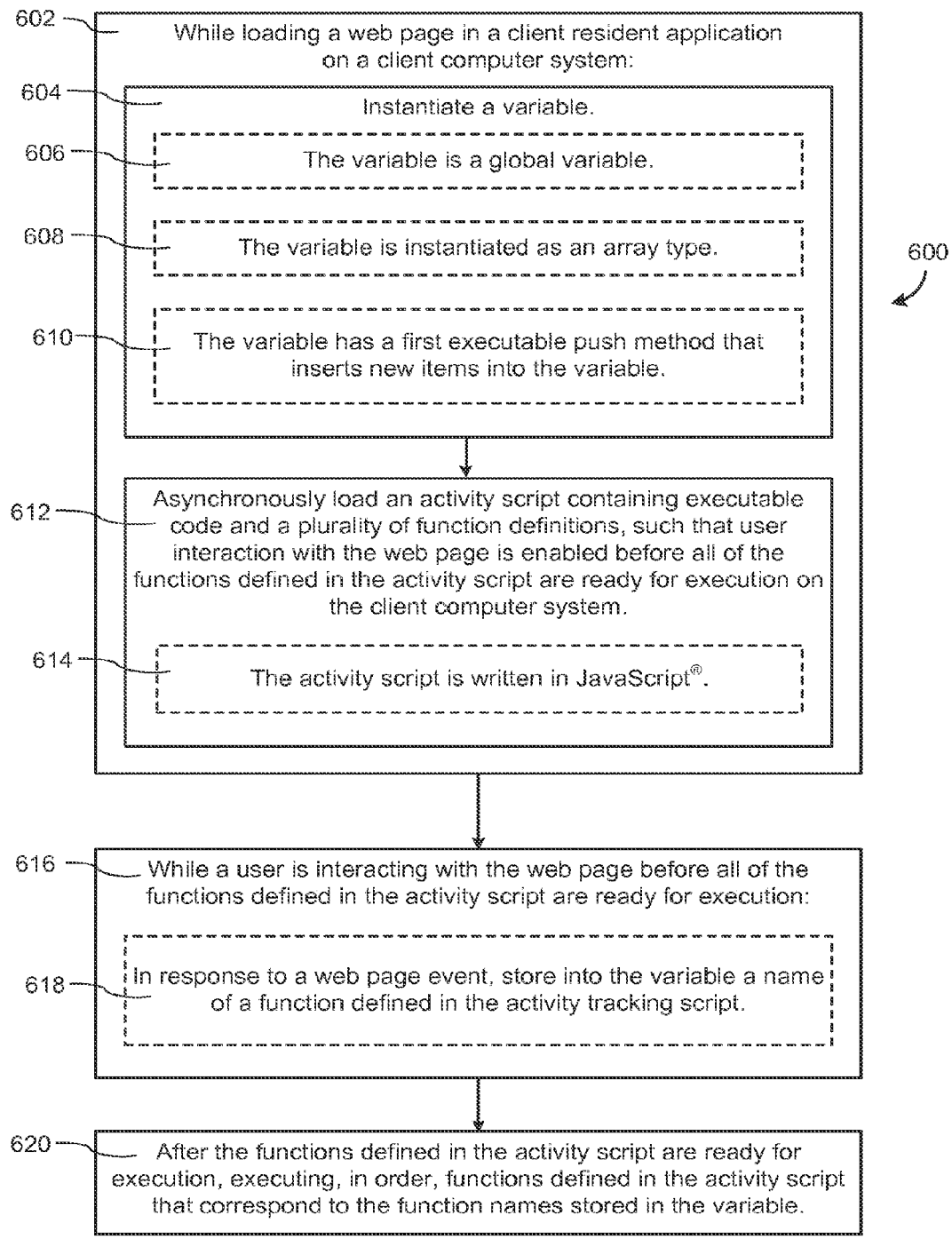
FIG. 6 provides an alternative descriptive process flow for asynchronously loading a script according to some embodiments.

FIG. 6 provides an alternative descriptive process flow for a method 600 for rendering a web page on a client computer system. While loading a web page in a client resident application (such as a web browser) on a client computer system (602), several operations are performed. Initially, a variable is an instantiated (604). In some embodiments, the variable is a global variable (606). In some embodiments, the variable is instantiated as an array type (608). In some embodiments, the variable has a first executable push method that inserts new items into the variable (610).

The client computer system 104 asynchronously loads an activity tracking script containing executable code and a plurality of functions, such that user interaction with the web page is enabled before all of the functions defined in the activity tracking script are ready for execution on the client computer system 104 (612). In some embodiments, the activity tracking script is written in JavaScript (614). As noted above, the Google Analytics script "ga.js" is an exemplary activity tracking script.

While a user is interacting with the web page before all of the functions defined in the activity script are ready for execution (616), the client computer system 104 stores information in the variable (618). In response to a web page event, the client system 104 stores into the variable a name of a function defined in the activity tracking script (618). After the functions defined in the activity tracking script are ready for execution, the client computer system 104 executes (620), in order, functions defined in the activity tracking script that correspond to the function names stored in the variable.

Figure 7:
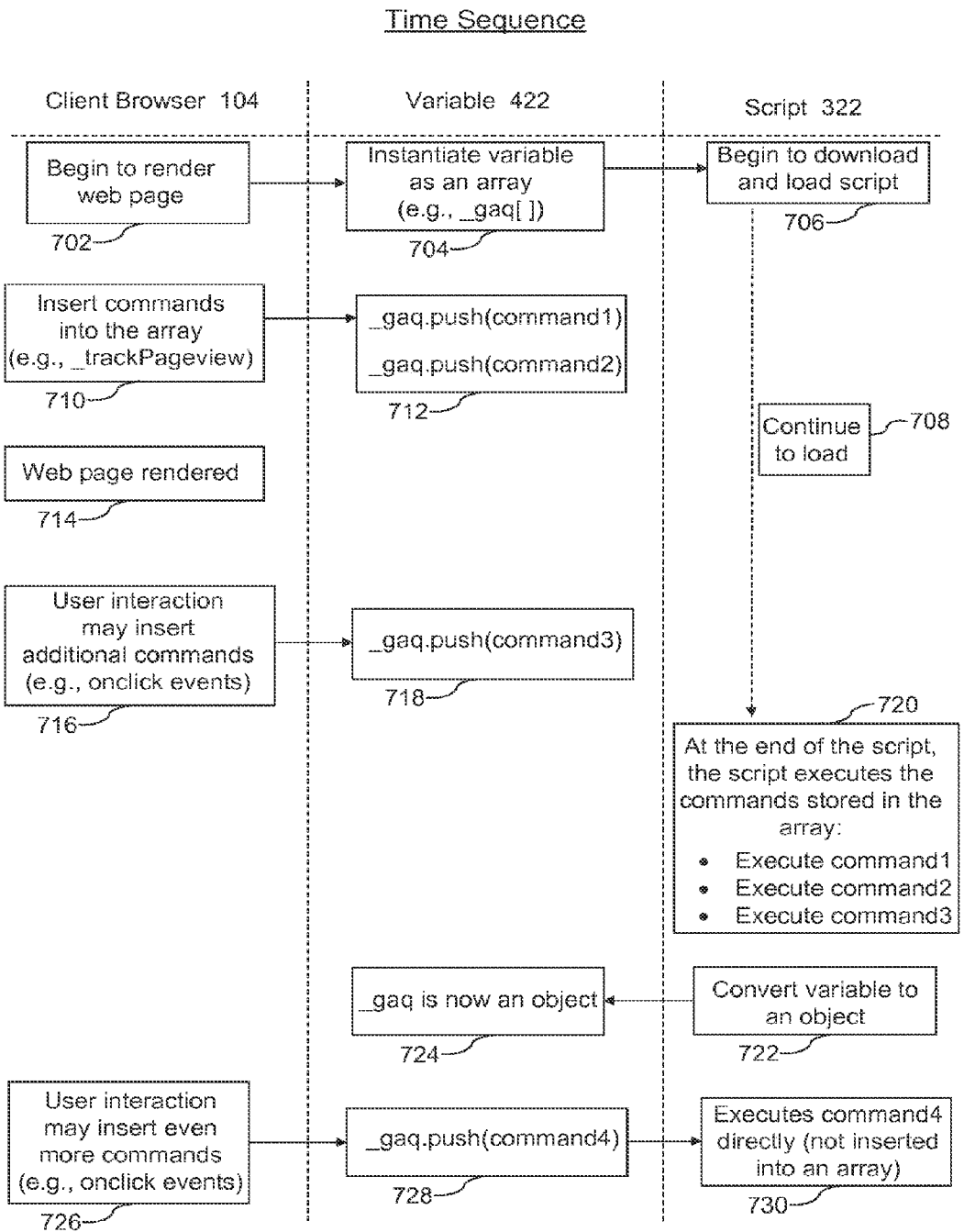
FIG. 7 provides a descriptive time sequence of events for asynchronously loading a script according to some embodiments.

FIG. 7 provides an exemplary description of the timing of various operations performed by or in relation to a web browser 104, variable 422, and script 322 on the client 104 while the web page 122 is loading and afterwards. Items appearing lower in FIG. 7 occur after items that appear higher. The process begins when a client browser 104 begins to render a web page (702). Included in the web page 122 are code snippets 222 that execute to instantiate (704) a variable 422. In the exemplary embodiment of Google Analytics, the variable is named "_gaq", which is an acronym for "Google Analytics queue". For example, in some embodiments, execution of the statement "var_gaq=_gaq||[ ]" creates the global variable "_gaq" if that variable does not already exist. As shown more fully in FIGS. 9A and 9B below, after the variable 422 is created, the script 322 begins to load by calling the JavaScript "appendChild( )" function. In most web browsers that adhere to the HTML 4.0 or 4.01 specification, the "appendChild( )" function causes the script to download asynchronously, so the remainder of the web page can be rendered while the script loads (706). While the script continues to load (708), the web page may insert (710) commands into the variable 422. In some embodiments, commands are inserted into the variable 422 by calling the variable's "push" method 802, such as "_gaq.push(command1)" and "_gaq.push(command2)" (712). At this point, the script has not fully loaded, so the commands are just inserted into the variable 422. The commands in the variable 422 (e.g., an array) form a queue that will be executed later. For example, as shown in FIGS. 9A and 9B below, in some embodiments, the functions "_setAccount( )" and "_trackPageview( )" are inserted after the "_gaq" variable is instantiated. These exemplary commands establish the appropriate tracking account and track that the user has opened the current web page 122.

Because the script 322 is loaded asynchronously, the script may be fully loaded either before or after the web page 122 is rendered (714). In the example shown in FIG. 7, the web page 122 is fully rendered before the script is fully loaded. After the web page 122 is loaded (or even before in some embodiments), user interaction with the web page may create tracking events that insert (716) additional commands into the variable. In the embodiment shown in FIG. 7, the command is inserted into the variable using the variable's executable "push" method: _gaq.push(command3) (718). Because the script is not yet fully loaded, the command is just inserted into the variable; the command is not yet executed. One example of user interaction is clicking on a button or hyperlink, as shown in FIG. 10 below. An "onclick" parameter within an HTML tag can call a method (such as _gaq.push( )) when the hyperlink is clicked or a button is pressed.

If the user does not quickly navigate to a different web page, the script 322 will eventually complete loading while the web page 122 is rendered in the browser (or before the web page is fully rendered). At the end of the script is a portion of executable code 324 that performs two actions. One action is to execute (720) all of the commands that have been saved in the variable 422. In preferred embodiments, the commands are executed in the order in which they were inserted into the variable, but in other embodiments they may be reordered based on other criteria, and executed as reordered. For example, some embodiments tweak the order to optimize execution, such as executing the quicker commands first, or scheduling execution of slower commands to prevent a long delay that is perceptible to a user. A second action is to convert (722) the variable to an object, where the object definition appears in the script. After the conversion, the variable 422 is an object of a new type which is different from the type the variable had when it was instantiated (724). For example, if the variable was instantiated as an array, it is no longer an array after this conversion. This process effectively creates a new object variable, but because the new object variable has the same name as the previous variable, it replaces the previous variable. In preferred embodiments, the object variable has an executable "push" method that has the same parameter signature as the "push" method of the original variable, so that calls to the push method can be made without regard to whether the variable has been recast or not. For example, in the embodiment of FIG. 7, calls to "_gaq.push(command)" work regardless of whether the variable "_gaq" is an array or an object type defined in the script.

After the script is loaded and the variable has been converted, subsequent tracking events execute differently than before. When additional user interaction creates another tracking event (726), the tracking code calls the push method as before (e.g., "_gaq.push(command4)") (728), but the command executes immediately (730) rather than being inserted into the variable.

Although some embodiments instantiate the variable 422 as an array, one of ordinary skill in the art will recognize that the variable 422 need not be instantiated as an array type. For example, in some embodiments, the initial script snippet 322 includes a class definition, and the variable 422 is instantiated as an object of that type. In these embodiments, the instantiated object provides storage space for a queue of commands and includes a function to insert commands.

FIG. 8 illustrates an exemplary array structure for the variable 422. The array variable 422 has one or more executable methods, including a "push" method 802 that inserts new elements into the array. In some embodiments, the array has methods to pop elements from the array, to sort or index the elements of the array, or to ascertain the number of elements in the array. In addition to the executable methods, the array variable 422 includes space for the array elements. In FIG. 8, the array variable 422 is shown holding three elements, corresponding to commands: command 1 (804), command 2 (806), and command 3 (808). The array variable 422 also has additional space 810 that can hold more commands. In preferred embodiments the array variable 422 is a variable length array, but in some embodiments a fixed-length array may be used.

In some embodiments, the elements of array variable 422 are command arrays. A command array, as used herein, is an array whose first element is the name of a command, and the remaining elements are the parameters for the respective command. In alternative embodiments, array variable 422 is a two dimensional array with a fixed number of columns based on the maximum number of parameters a function may have. In either case, each command comprises a function name 812 and a set of event parameters 814. In preferred embodiments, the values of the parameters are determined before the command is inserted into the array 422. In alternative embodiments, one or more of the parameters is saved to the array 422 as an expression, and the expression is evaluated later, such as when the command is ultimately executed. The parameters may comprise any relevant data associated with an event, such as the date/time the event occurred 816, the event type 818, a session ID 820, or an account ID 822. In some embodiments, a session ID 820 identifies a related series of user interactions with a website during a certain period of time.

FIG. 9A provides exemplary code snippets 222 that appear in a web page 114-1. In the snippets 222, line 902 declares "_gaq" as an array variable if it does not already exist. Lines 904 and 906 execute the variable's push method 802 to insert command arrays into the variable "_gaq" 422. In line 904, the command array has the function name "_setAccount" (812), and event parameter UA-65432-1 814, which identifies the web page 122 to the analytics server 118. In line 906, the command "_trackPageview" is the function name (812), and has no event parameters. The call to load the script (908) has three parts, which correspond to lines 910, 912, and 914 in the alternative snippets shown in FIG. 9B.

FIG. 9B provides alternative exemplary code snippets 222, which are the same as FIG. 9A except that the call to load the script 908 in FIG. 9A is executed as three individual pieces 910, 912, and 914 in FIG. 9B. Line 910 creates a variable "script" that will hold the name and location of the script. In line 912, the name and location of the script are specified. In this embodiment, the location depends on the protocol used to access web page 114-1. Line 914 calls the JavaScript "appendChild( )" function to load the script. FIG. 10 provides an exemplary HTML hyperlink that includes tracking code that is called when the hyperlink is clicked. The onclick portion 1002 of the hyperlink 224 captures the event of clicking on the hyperlink. In particular, when the hyperlink is clicked, the push method of variable 422 is called with the function name "_trackEvent" 812, and the appropriate event parameters 814 category and action.

Figure 11:
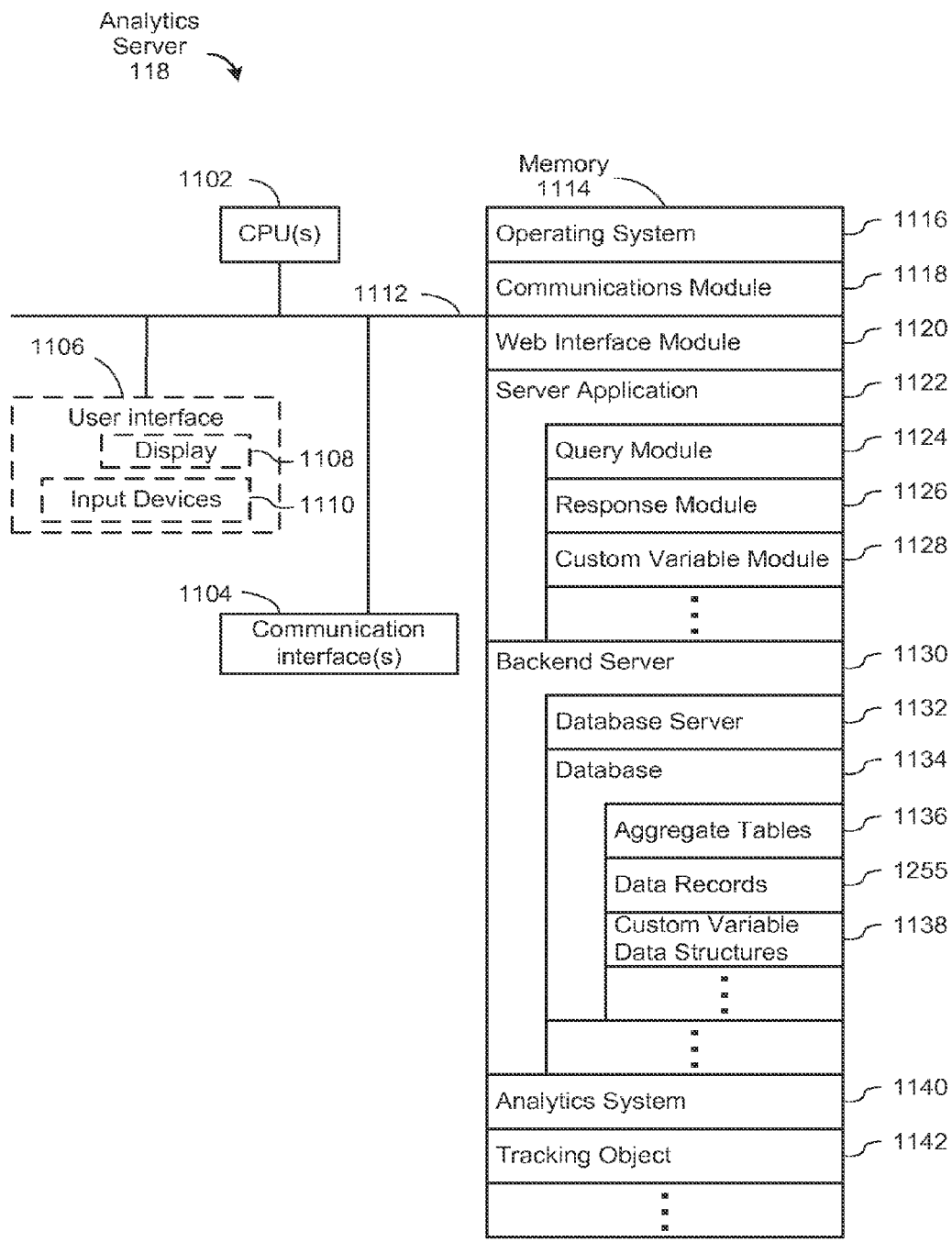
FIG. 11 is a functional description of a web analytics server according to some embodiments.

FIG. 11 is a block diagram of an analytics server 118 that tracks traffic data and generates views of the traffic data according to some embodiments. The analytics server generally includes one or more processing units (CPU's) 1102, one or more network or other communications interfaces 1104, memory 1114, and one or more communication buses 1112 for interconnecting these components. The analytics server 118 may optionally include a user interface 1106 with a display device 1108 and input devices 1110 (e.g., a keyboard, a mouse, a track pad, etc.). In some embodiments, memory 1114 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. In some embodiments, memory 1114 includes one or more storage devices remotely located from the CPU(s) 1102. Memory 1114, or alternately the non-volatile memory device(s) within memory 1114, comprises a computer readable storage medium. Memory 1114 or the computer readable storage medium of memory 1114 stores the following elements, or a subset of these elements, and may also include additional elements:

- an operating system 1116 as described above with respect to operating system 216;
- a network communication module 1118 as described above with respect to communications module 218;
- a web interface module 1120 for receiving requests and tracking information from client devices, and for returning reports in response to the client requests;
- a server application 1122, including a query module 1124 for converting client requests into one or more queries or data filters targeting at the backend 1130, a response module 1126 for preparing analytics reports based on the response from the backend 1130, and a custom variable module 1128 for processing requests for analytics data relating to custom variables as described in U.S. Provisional Patent Application No. 61/253,476;
- a backend server 1130 including a database server 1132 with a database 1134. In some embodiments the database 1134 contains data records 1255 such as the one shown in FIG. 12, and custom variable data structures 1138 as described in U.S. Provisional Patent Application No. 61/253,476. In some embodiments, the database 1134 contains aggregate tables 1136, as described in U.S. Provisional Patent Application No. 61/181,275 and U.S. Provisional Patent Application No. 61/181,276;
- a web analytics system 1140 for pre-processing log files into sessionized web traffic data records; and
- a tracking object 1142 that provide raw web traffic data to the analytics system 1140.

Figure 12:
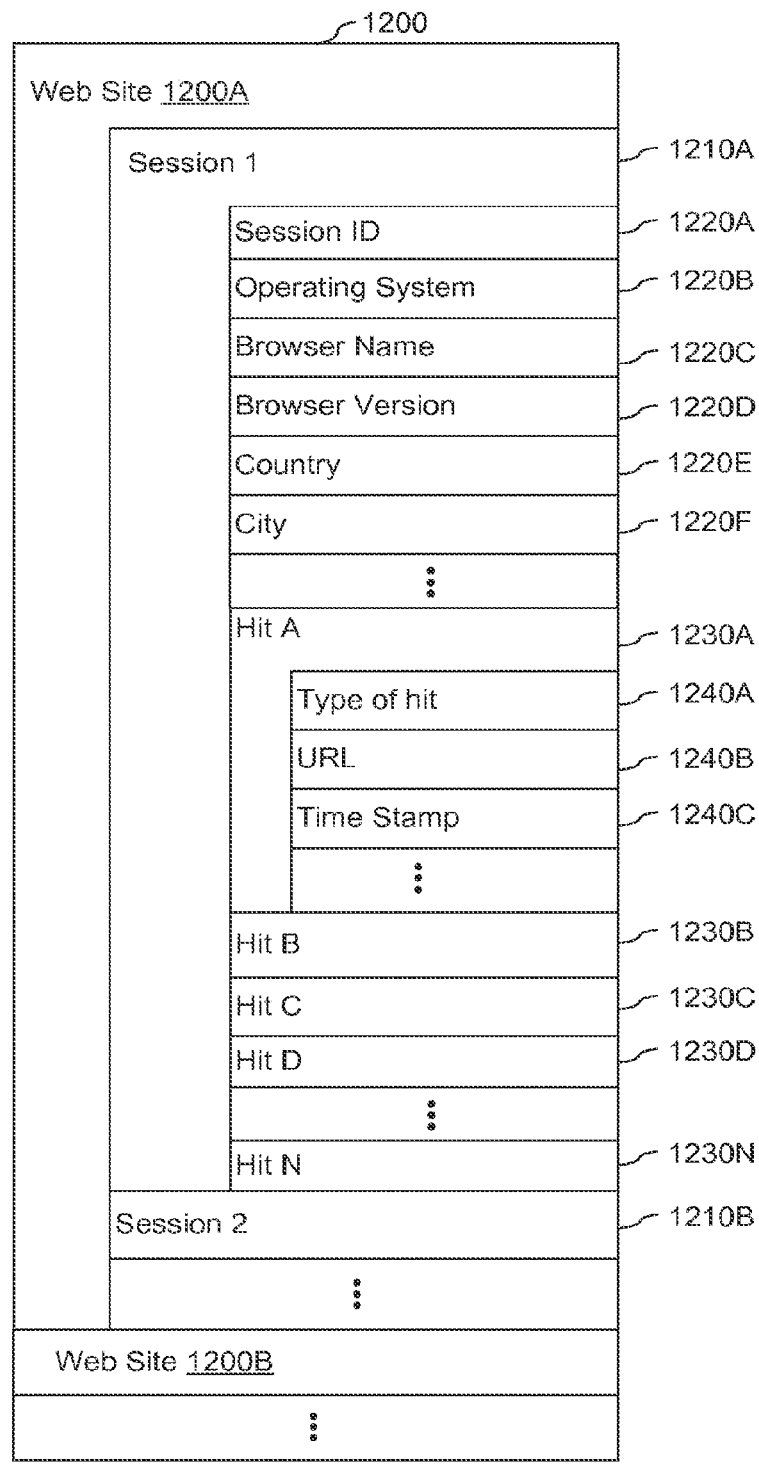
FIG. 12 illustrates an exemplary data structure for tracking web page events according to some embodiments.

FIG. 12 is a block diagram of a data structure for hit records used in the hits database 1255 on the analytics server 118 to store sessionized web traffic data for different web sites in accordance with some embodiments. The web traffic data stored in the data structure 1200 has a hierarchical structure. The top level of the hierarchy corresponds to different web sites 1200A, 1200B (i.e., different web servers). For a respective web site, the traffic data is grouped into multiple sessions 1210A, 1210B, and each session has a unique session ID 1220. A session ID uniquely identifies a user's session with the web site 1200A for the duration of that user's visit. Within a session 1210A, other session-level attributes include the operating system 1220B (i.e., the operating system the computer runs on from which the user accesses the web site), the browser name 1220C (i.e., the web browser application used by the user for accessing the web site) and the browser version 1220D, geographical information of the computer such as the country 1220E and the city 1220F, etc.

For convenience and custom, the web traffic data within a user session (or a visit) is further divided into one or more hits 1230A to 1230N. Note that the terms "session" and "visit" are used interchangeably throughout this application. In the context of web traffic, a hit typically corresponds to a request to a web server for a document such as a web page, an image, a JavaScript file, a Cascading Style Sheet (CSS) file, etc. Each hit 1230A may be characterized by attributes such as the type of hit 1240A (e.g., transaction hit, etc.), the referral URL 1240B (i.e., the web page the visitor was on when the hit was generated), the timestamp 1240C that indicates when the hit occurs and so on. Note that the session-level and hit-level attributes as shown in FIG. 12 are listed for illustrative purposes only. A session or a hit of web traffic data may include many other attributes that either exist in the raw traffic data (e.g., the timestamp) or can be derived from the raw traffic data by an analytics server 118 (e.g., the average pageviews per session). Aggregation and analysis of hit data is performed by an analytics server 118, as described in more detail in provisional application 61/253,472. The tracking of web page events is provided for a web page or a collection of web pages in a web site using snippets 222 of code embedded in a web page 114-1, an activity tracking script 322 provided by a script server 116, and event capture code 224 embedded in the web page 114-1. Based on certain user interaction with a rendered web page 122, tracking events 124 are transmitted to the analytics server 118 and saved in the analytics database 120.

FIGS. 13A-13D illustrate snippets 222 of code for tracking events within a web page 114-1. In the example shown in FIGS. 13A-13D, a user has purchased a T-Shirt for 11.99, and the tracking code shown is executed when the user is viewing on online receipt for the transaction. In some embodiments, these snippets 222 of code are embedded in the associated web page 114-1. FIG. 13A provides exemplary code that could be used when the activity tracking script 322 is loaded synchronously. In the embodiment of FIG. 13A, a tracking object "pageTracker" is instantiated (1310), which is then used in four subsequent calls. After an initial call to track the pageview ("pageTracker._trackPageview") (1312), the code calls (1314) the "_addTrans( )" function with eight parameters to identify a purchase transaction. The code also calls (1316) the "addItem( )" function with six parameters to provide additional information about the specific item purchased. If there had been a single transaction with multiple items in the order, there would still only be a single call to the "_addTrans( )" function, but there would be calls to the "addItem( )" function for each item in the transaction. Finally, the code calls (1318) the "_trackTrans( )" function, which essentially closes the transaction. In preferred embodiments, the parameters (such as '1234') would be passed as variables (such as orderID) rather than as literal values, and comments (such as "II order ID—required") would be omitted.

FIGS. 13B-13D provide three alternative ways to track the same event as the one illustrated in FIG. 13A. In some embodiments, all three methodologies are supported, but in other embodiments, only one or two of the methodologies are supported. FIG. 13B takes the code from FIG. 13A, and wraps it inside a function. That is, the code shown in FIG. 13A is incorporated into a function, and the function is pushed into the variable 422 (or executed directly if the script is fully loaded). Note, in particular, that the code has the same declaration of a tracker variable (1320), the same call to track the pageview ("pageTracker._trackPageview") (1322), the same calls to the "_addTrans( )" function and the "addItem( )" function, and the same call to the "trackTrans( )" function to close the transaction. Because the entire function definition is passed to the "push( )" method, the function can be called later when the script is fully loaded. This difference allows the code in FIG. 13B to execute before the script 322 is fully loaded; if the script 322 is not loaded, the function is placed in a queue for later execution. However, in FIG. 13A, the code would fail (e.g., raise an error) if the definitions of "_trackPageview( )", "_addTrans( )", "_addItem( )", or "trackTrans( )" were not already loaded from the script 322.

The exemplary code in FIGS. 13C and 13D create the same effect as the code in FIG. 13B, but use command arrays instead. As noted earlier, a command array is an array whose first element is the name of the command, and the subsequent array elements are the parameters for the command. In FIG. 13C, there are five separate calls to variable's "push( )" method, one for each command to be executed. In line 1330, the "_setAccount" command is passed a command array, which establishes the proper account for tracking purposes.

In line 1340, the command "_trackPageview" is passed in a single element command array without any parameters. As seen above in FIGS. 13A and 13B, lines 1334, 1336, and 1338 in FIG. 13C call the "push( )" method with command arrays for "_addTrans( )", "_addItem( )", and "_trackTrans( )".

The code in FIG. 13D is nearly the same as the code in FIG. 13C, except that all five command arrays are passed (1340, 1342, 1344, 1346, and 1348) to the "push( )" method at the same time.

FIGS. 13A-13D illustrate some of the functions that may provided by the script 322. Additional functions may be defined in the script 322 that set or get various properties. For example, in some embodiments, there is a "getAccount( )" function that returns the tracking ID for a tracker object. If a website owner tracks pages on the website in multiple accounts, this function can determine the account that is associated with a particular tracker object.

In some embodiments, the code in snippets 222 (shown in FIGS. 9A and 9B) is broken into two or more segments. FIG. 14 provides an outline of an exemplary web page 114-1, in which the snippets 222 are split into two pieces. In the <head> section of the HTML code is a script portion that includes a declaration 1402 for the variable "_gaq". After the declaration in the script 322 is a push operation 1404, which pushes a command to set the tracking account, and another push operation 1406, which pushes a command to track the pageview. The declaration 1402 and push operations 1404 and 1406 execute very quickly, and thus have no perceptible effect on the loading of the web page (even though they execute synchronously). In some embodiments, the call 1408 to load the tracking script 322 is placed at or near the bottom of the HTML <body>, and thus has little effect on the loading of the remainder of the web page. In the embodiment shown in FIG. 14, the commands inserted in the variable 422 will remain in the queue longer before execution because the script 322 is loaded later. However, because the variable 422 is instantiated early, all of the tracking events are captured. The embodiment shown in FIG. 14 may be used when users of the web page 114-1 are more likely to use web browsers 106 for which the "appendChild( )" method executes synchronously. That is, by placing the call 1408 to load the script at the bottom of the HTML body, it does not significantly affect web page loading time, even if the script loads synchronously. In some preferred embodiments, the script loading code 1408 is placed immediately after the push command 1406, in the HTML <head>.

FIG. 15 illustrates alternative adapter snippets 222' that create an additional abstraction layer between calls to functions and the actual functions defined in the script 322. In the methodology illustrated in FIG. 15, there is a variable (e.g., "_gaq") that stores commands as described above, and the commands are executed once the script is fully loaded. However, in the embodiment of FIG. 15, a new type of object (e.g., AsyncTracker) is created, and acts as a skeleton to receive the function calls and insert them into the variable. Because the new object is just a simple skeleton without the actual code to perform the underlying functionality, the definition of the new adapter class in adapter snippets 222' loads quickly.

In the definition of the new class, a new local array variable (e.g., "api") is created that lists all of the possible functions (1502). These are the function names for the corresponding functions that are defined in the script. That is, for each function definition that appears in the script (and is used by the web page 114-1), the same function name appears in the local array variable (1502). In the embodiment of FIG. 15, conversion code 1504 converts each function call into a command array, and calls the "push( )" method 802 with the command array.

Because the embodiment in FIG. 15 instantiates a new object, the declaration 1506 uses "new" in the syntax. The same syntax must be used anywhere one of these objects is instantiated.

The alternative adapter snippets 222' have the advantage of calling functions with standard JavaScript syntax rather than calling a "push" method with a command array. In particular, if existing web pages already have numerous calls to functions in a script, the methodology illustrated in FIG. 15 provides a way of loading the script asynchronously without changing all of the existing function calls. One disadvantage is that the local variable declaration 1502 in skeleton script 222' must include all of the functions that will be called from the web page. If a web page is later modified to call a function not used before, the local variable array declaration 1502 must be updated to include the additional function name.

In FIGS. 2, 3, 4, and 11, multiple elements were identified that may be stored in one or more of the previously mentioned memory devices, and correspond to a set of instructions for performing the functions as described. The identified modules or programs (i.e., sets of instructions) need not be implemented as separate software programs, procedures or modules, and thus various subsets of the modules may be combined or otherwise re-arranged in various embodiments. In some embodiments, memory 214 in FIG. 2 (or memory 314 in FIG. 3, memory 414 in FIG. 4, or memory 1114 in FIG. 11) may store a subset of the modules and data structures identified.

Although FIGS. 2, 3, 4, and 11 show various computer systems that perform identified functions according to embodiments of the present invention, these figures are intended more as functional descriptions of the various features that may be present in a set of one or more computers rather than as a structural schematic of the embodiments described herein. In practice, and as recognized by those of ordinary skill in the art, items shown separately could be combined and some items could be separated. For example, some items shown separately in these figures could be implemented on individual computer systems and single items could be implemented by one or more computer systems. The actual number of computers used to implement the functionality in these figures and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of loading a web page, comprising:
providing, via a computer network and to a computing device having one or more processors, a script configured for loading with a web page, the web page configured for display on the computing device, the script having a plurality of function definitions and configured for asynchronous loading such that the web page is operable while the script is loaded;
receiving an indication of a user interaction with the web page prior to complete loading of the plurality of function definitions on the web page;
determining that the user interaction corresponds to a function definition of the plurality of function definitions that has not been loaded;
subsequent to determining that the user interaction corresponds to the function definition that has not been loaded:
instructing, using a variable, the computing device to queue a command string corresponding to the function definition;
determining that the function has been loaded and instructing the computing device to retrieve the command string from the variable; and
instructing the computing device to execute the function definition corresponding to the command string.

2. The method of claim 1, further comprising:
instantiating the variable as a global variable.

3. The method of claim 1, further comprising:
instantiating the variable as an array.

4. The method of claim 1, further comprising:
identifying an event on the web page.

5. The method of claim 1, further comprising:
inserting, via an executable push method of the variable, a new item into the variable.

6. The method of claim 5, further comprising:
converting, by the script, the variable to an object type defined in the script.

7. The method of claim 1, wherein the command string has a corresponding set of one or more parameters.

8. The method of claim 1, further comprising:
determining values of the one or more parameters; and
inserting the values and a corresponding command string in the variable.

9. The method of claim 1, further comprising:
receiving, by a server having one or more processors, a request for the script; and
providing, by the server, the script responsive to the request.

10. The method of claim 1, further comprising:
providing, by a server having one or more processors, the script prior to the web page loading.

11. A system for loading a web page, comprising:
one or more processors and memory configured to:
provide, via a computer network and to a computing device having one or more processors, a script configured for loading with a web page, the web page configured for display on the computing device, the script having a plurality of function definitions and configured for asynchronous loading such that the web page is operable while the script is loaded;
receive an indication of a user interaction with the web page prior to complete loading of the plurality of function definitions on the web page;
determine that the user interaction corresponds to a function definition of the plurality of function definitions that has not been loaded;
subsequent to determining that the user interaction corresponds to the function definition that has not been loaded:
instruct, using a variable, the computing device to queue a command string corresponding to the function definition;

determine that the function has been loaded and instruct the computing device to retrieve the command string from the variable; and instruct the computing device to execute the function definition corresponding to the command string.

12. The system of claim 11, wherein the variable is a global variable.

13. The system of claim 11, wherein the variable as an array.

14. The system of claim 11, wherein the script is an activity tracking script configured to track an event on the web page.

15. The system of claim 11, wherein the variable is further configured to:

insert, via an executable push system of the variable, a new item into the variable.

16. The system of claim 15, wherein the script is further configured to:

convert the variable to an object type defined in the script.

17. The system of claim 11, wherein the command string has a corresponding set of one or more parameters.

18. The system of claim 11, wherein the one or more processors are further configured to:

determine values of the one or more parameters; and insert the values and a corresponding command string in the variable.

19. The system of claim 11, wherein the one or more processors are further configured to:

receive a request for the script; and provide the script responsive to the request.

20. The system of claim 11, wherein the one or more processors are further configured to:

provide the script prior to the web page loading.

* * * * *